Jan. 31, 1928.
G. C. SMITH
1,657,871
CHANGE SPEED TRANSMISSION
Filed Feb. 13, 1926
3 Sheets-Sheet 1
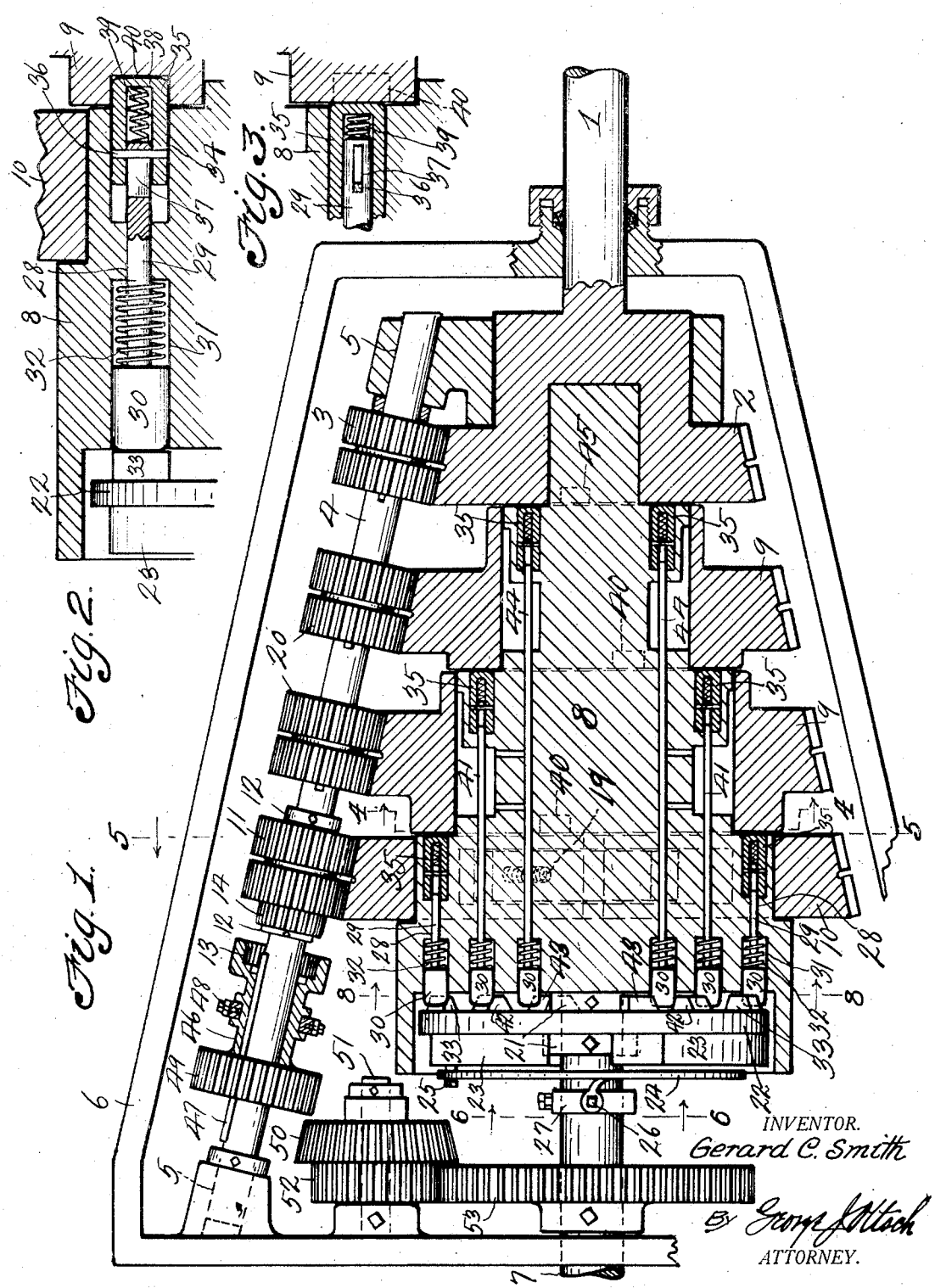
INVENTOR.
Gerard C. Smith
BY George J. Attach
ATTORNEY.

Jan. 31, 1928.

G. C. SMITH 1,657,871

CHANGE SPEED TRANSMISSION

Filed Feb. 13, 1926

INVENTOR:
Gerard C. Smith
BY George J. Oltsch
ATTORNEY.

Patented Jan. 31, 1928.

1,657,871

UNITED STATES PATENT OFFICE.

GERARD G. SMITH, OF SOUTH BEND, INDIANA, ASSIGNOR OF ONE-FOURTH TO GEORGE J. OLTSCH, ONE-FOURTH TO JOSEPH F. DONAHUE, AND ONE-FOURTH TO DONALD ELBEL, ALL OF SOUTH BEND, INDIANA.

CHANGE-SPEED TRANSMISSION.

Application filed February 13, 1926. Serial No. 88,121.

The invention relates to change speed transmissions, particularly adapted for use in connection with automobiles, and has for its object to provide a change speed transmission mechanism, in which the change from one speed to another takes place automatically, and is controlled through the speed at which the automobile travels. At the start, and as the automobile gains in speed up to a predetermined point, a high gear automatically shifts in through the medium of a plurality of step-up gears, consequently the transition from one speed to another is gradual and conversely the speed steps down automatically as the automobile speed is reduced as by throttling down or applying the brakes, whereby the transmission, when the automobile is brought to a stop is in low gear ready for a new start.

A further object is to provide a change speed transmission comprising a drive shaft and a propeller shaft, a block carried by the propeller shaft and having rotatably mounted thereon a plurality of gears which mesh with gears carried by a counter shaft, a drive gear carried by the drive shaft and meshing with a gear on the counter shaft, a plurality of push rods slidably mounted in the block, a spring controlled governor carried by the propeller shaft, and a plurality of lugs carried by the governor, and with which ends of the push rods engage at various speeds for locking the gears rotatably mounted on the head to the head.

A further object is to position the push rod controlled lugs on the governor disc whereby the locking of the gears to the head will be a progressive operation and stepped downwardly from high to low gear.

A further object is to provide means whereby after the gear locking is stepped from low speed to high speed a direct drive between the engine shaft and propeller is obtained, and at all other speeds, either forward or reverse the power is transmitted through a countershaft and countershaft gears.

A further object is to rotatably mount the counterweighted governor disc on the propeller shaft and to connect said disc to the propeller shaft by a coiled spring having one of its ends anchored to the governor disc and its other end anchored to the propeller shaft, and which coiled spring causes the governor disc to rotate with the propeller shaft but to lag in its rotation according to the speed of the propeller shaft, thereby allowing the push rod ends to overtake the lugs carried by the governor disc in their order and step from low speed to high speed, and conversely on reverse.

A further object is to provide ratchet connections between the low speed gear and the head thereby allowing the starting of the vehicle and the disconnecting of the low speed gear through the ratchet connection as the propeller shaft gains in speed and consequent shifting to higher gears.

A further object is to provide a gear on the countershaft and rotatable thereon, and which gear meshes with the lower speed gear, and a slidable clutch member on the countershaft and cooperating with said countershaft gear for locking the same to the countershaft. Also to provide said slidable clutch member with gear means cooperating with a gear train whereby a reversing of the direction of rotation of the propeller shaft may be obtained.

A further object is to provide spring means for normally forcing the push rods towards the governor disc and yieldably mounted locking sleeves on the inner ends of the push rods, and which sleeves have sliding engagement with the adjacent sides of the gears and are adapted to spring into arcuate recesses in the gear faces for locking the gears to the head.

A further object is to provide an automatic gear shifting mechanism for motor vehicles and governor controlled, said governor cooperating with means whereby the speeds are consecutively stepped from low to high speed, terminating in a direct drive and consecutively stepped from high to low speed.

With the above and other objects in view the invention resides in the combination and arrangement of parts as hereinafter set forth, shown in the drawings described and claimed, it being understood that changes in the precise embodiment of the invention may be made within the scope of what is claimed without departing from the spirit of the invention.

In the drawings:—

Figure 1 is a longitudinal sectional view through the change speed transmission.

Figure 2 is a detail sectional view through a portion of the head, showing a push rod in operative position.

Figure 3 is a view similar to Figure 2, but showing the locking sleeves in position to spring into one of the gear recesses when the recess registers therewith.

Figure 4:
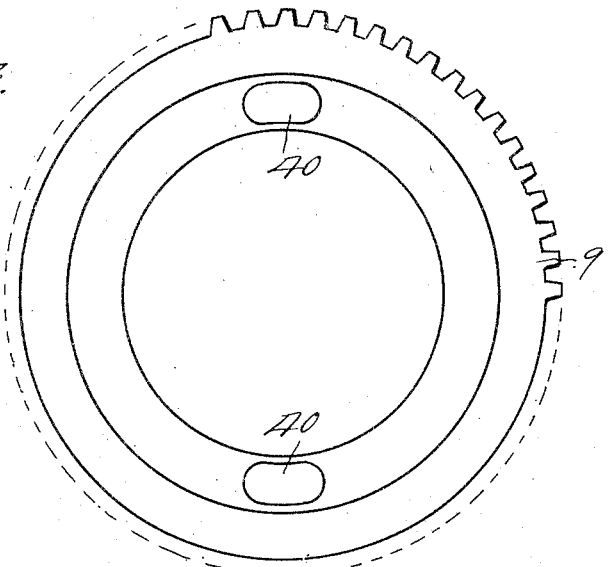
Figure 4 is a rear elevation of one of the gears rotatably mounted on the head and looking at the same in the direction of line 4—4 of Figure 1.
Figure 5:
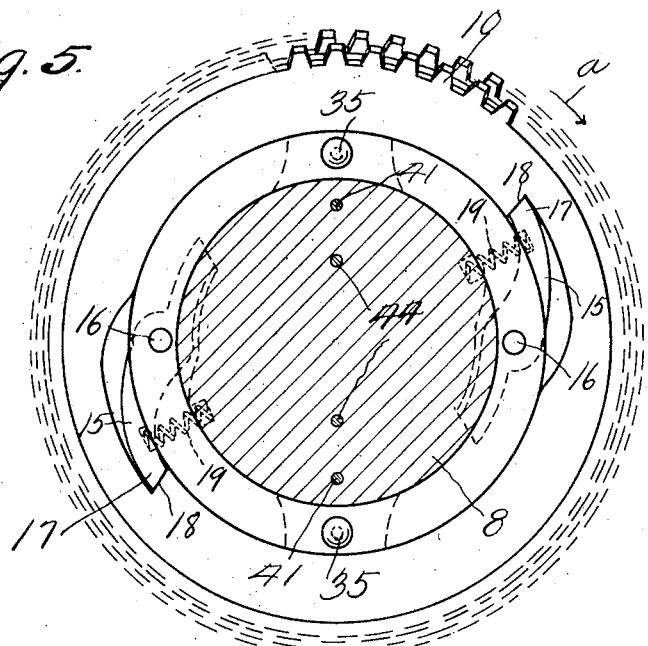
Figure 5 is a transverse sectional view taken on line 5—5 of Figure 1.
Figure 7:
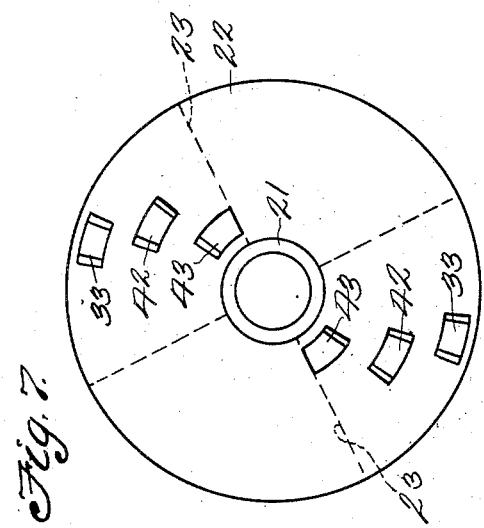
Figure 7 is a view in elevation of the governor disc.
Figure 9:
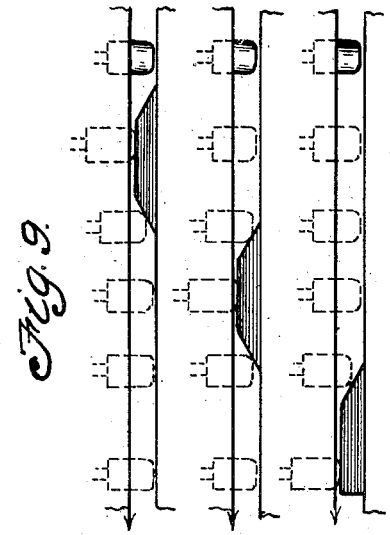
Figure 9 shows a diagrammatic view of the relative position of the push rods.

Referring to the drawings the numeral 1 designates the drive shaft which leads to a conventional form of internal combustion engine, the speed of operation of which is controlled by a conventional form of throttle valve, and it is to be understood that the shaft 1 may have in connection therewith a conventional form of clutch. The drive shaft 1 is provided with a high gear 2, which rotates therewith, and which gear 2 meshes with a gear 3 keyed on the countershaft 4. The countershaft 4 is rotatably mounted in bearings 5 of a transmission casing 6, therefore it will be seen that during the rotation of the drive shaft 1 and the gear 2, the counter-shaft 4 will rotate. Disposed axially in relation to the drive shaft 1 is a propeller shaft 7, which propeller shaft leads to the usual differential of a motor driven vehicle, and the inner end of the propeller shaft 7 is provided with a head 8, on which are rotatably mounted the intermediate gears 9 and the low speed gear 10. The low speed gear 10 meshes with a gear 11 which is rotatably mounted on the countershaft 4 between collars 12, therefore it will be seen that when the countershaft 4 rotates while the clutch member 13, which is slidably mounted on the countershaft is in engagement with the clutch element 14 carried by the gear 11, the gear 11 will rotate therewith, which will impart rotation to the gear 10 in the direction of the arrow $a$, Figure 5. The propeller shaft head 8 is provided with a plurality of pawls 15, which are pivotally connected thereto at 16, and which pawls have their noses 17 normally in engagement with the shoulders 18 of the low speed gear 10, and are held outwardly by means of coiled springs 19. Upon starting the engine the drive shaft 1 is rotated, which imparts rotation to the high gear 2, which transfers rotation to the countershaft 4, and with the clutch 13 in cooperative engagement with the gear 11, said gear 11 will be rotated, thereby imparting rotation to the low gear 10 in the direction of the arrow $a$, and through the medium of the pawls 15 the low gear 10 will rotate the head 8 and the propeller shaft 7, all of which operation is upon the initial starting of the vehicle, and the pawls 15 are disengaged from the shoulders 18 as higher gears are thrown into operation automatically as the speed increases and the head gains in speed in relation to the low gear 10.

Figure 6:
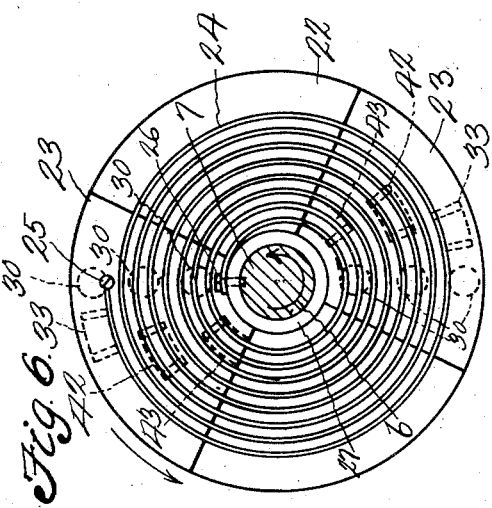
Figure 6 is a transverse sectional view taken on line 6—6 of Figure 1.
Figure 8:
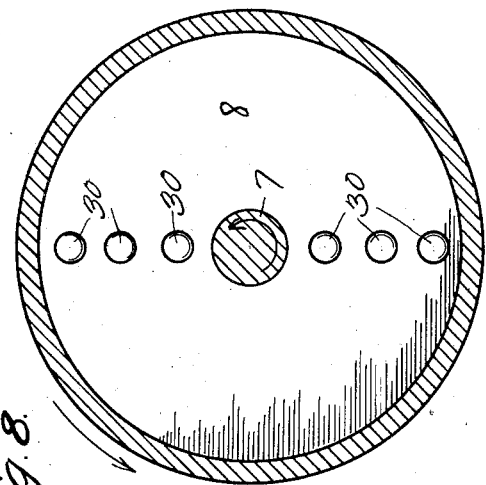
Figure 8 is a transverse sectional view taken on line 8—8 of Figure 1.

Keyed on the countershaft 4 are spaced gears 20, which gears 20 mesh with the intermediate gears 9, however as the gears 9 are rotatably mounted on the head 8 they will not interfere with the driving of the low gear 10 by the gear 11 upon the starting of the vehicle. Rotatably mounted on the propeller shaft 7 between collars 21 is a governor disc 22, which governor disc is provided with spaced weights 23, which assist in a retarding action thereof. Surrounding the propeller shaft 7 is a coiled spring 24, one end of which is anchored at 25 to the weight member 23 carried by the governor disc 22, and the other end is anchored at 26 to a collar 27 which is adjustably mounted on the propeller shaft 7. It will be noted that as the propeller shaft 7 rotates in the direction of arrow $b$, Figure 6, the governor disc 22 will rotate therewith, but on account of the coiled spring connection 24, between the governor disc and the shaft 7 and the weights 23 carried by the disc, there will be a lag movement of the governor disc 22 and the distance of the lag movement will vary and become greater in relation to the speed of rotation of the propeller shaft 7 upon increased speed of rotation of the shaft 7, the purpose of which will presently appear.

Slidably mounted in bearings 28 of the head 8 and at opposite sides of the axis thereof are push rods 29, which push rods are provided with heads 30, slidably mounted in recesses 31 in the head, and which heads 30 are normally forced outwardly towards the governor disc 22 by means of coiled springs 32, and into the path of the cam lugs 33 of the disc 22 where they will be forced inwardly by the cam lugs 33 upon a retarded movement of the disc 22, and pushed inwardly against the action of the coiled springs 32. Slidably mounted in recesses 34 in the head 8 are locking sleeves 35, which locking sleeves are provided with transversely disposed pins 36, which extend through elongated slots 37 in the push rods 29, and interposed between the end of the push rod and the bottoms of the recesses 38 of the sleeves 35 are coiled springs 39, which coiled springs maintain, when the sleeves are in locked position, the pins 36 in engagement with the outer ends of the slots 37, and at which time the sleeves 35 are maintained in the recesses 40 in the adjacent side of the adjacent intermediate gear 9. The springs 32 are sufficiently heavy and have sufficient expansive action to immediately, upon the passage of the cam lugs 33, withdraw the sleeves 35 from the recesses 40 of the gear, thereby releasing the gear. The recesses 40 are elongated, thereby allowing the sleeves to quickly and easily enter the same and for a brief lapse of time as sleeves of one gear are disengaged and engaged. Slidably mounted in the head 8 are rods 41 similar to the rods 29 and having the same construction, and which rods 41 cooperate with the other intermediate gear 9, and the same general numerals apply thereto. The rods 41 have their heads 30 disposed in the path of the cam lugs 42 on the governor disc 22, and which lugs 42 are stepped to one side of the lugs 33 and do not engage the heads 30 of the push rods 41 until the lugs 33 pass the heads 30 of the push rods 29, therefore it will be seen that the shaft 7 is rotated at a higher speed than when the cam lugs 33 are in operative position and there is a further lagging of the governor disc 22. However as one intermediate gear is disengaged the other intermediate gear is locked to the propeller shaft head 8. As the speed of the propeller shaft 7 increases the cam lugs 43, incident to the lagging movement of the governor disc 22 engage the push rod heads 30 of the push rods 44 and compress the springs within said push rod sleeves whereby as the high speed gear 2 rotates the sleeve will be received in the recesses 45 of the high speed gear, and at which time there will be a direct drive from the shaft 1 to the propeller shaft 7. Upon a reduction of power incident to throttling down of the engine, the lugs 43 will, incident to the tension of the spring 24, gain on the propeller shaft 7 and move out of engagement with the heads 30 of the push rods 44, consequently their sleeves will disengage from the high gear 2, however the gear 20 will drive the adjacent intermediate gear, which is locked to the head 8 through the medium of the push rods 41, and when there is a further reduction of speed in the propeller shaft 7, the rods 41 will be disengaged from the gear 9, and the driving of the head 8 will take place through the other countershaft gear 20, and the rear intermediate gear 9. After the retraction of the push rods 29, the driving through the intermediate gears is stopped, and said intermediate gears will freely rotate on the head; however the pawls 15 will move into cooperative engagement with the low speed gear 10 and the transmission will be in proper gear for starting on low speed when the clutch member 13 is moved into cooperative engagement with the clutch member 14 of the gear 11. Clutch member 13 is carried by a sleeve 46, which is slidably keyed on a key 47 carried by the countershaft 4, and which sleeve 46 has connected thereto a conventional form of collar 48, which is lever controlled in the usual manner.

When it is desired to reverse the direction of movement of the vehicle and of the propeller shaft 7, the sleeve 46 is moved rearwardly thereby forcing the gear 49 into mesh with the gear 50, which is rotatably mounted on the stub shaft 51. Gear 50 is provided with a gear 52, which rotates therewith, and which gear 52 meshes with a gear 53 carried by the propeller shaft 7, therefore it will be seen that a reverse rotation of the shaft 7 is obtained. It will also be seen that the various speeds may be obtained upon the reverse rotation.

From the above it will be seen that an automatic speed change transmisison mechanism is provided whereby the speed of operation is automatically stepped upwardly from a low speed to a high speed, and to a direct drive and automatically stepped downwardly from a high speed to a low speed, thereby getting the maximum efficiency out of an engine, particularly a motor vehicle, and increasing the speed automatically as increased or diminished power is desired. It will also be seen that it will be impossible for the operator to immediately shift from low gear to high gear in the starting of the vehicle, thereby obviating jerking or damage to the mechanism, and upon stopping of the vehicle the mechanism will automatically unlock and return to position where the starting of the vehicle will be on the low speed gear.

The invention having been set forth what is claimed as new and useful is:—

1. The combination with a change speed transmission mechanism comprising a drive shaft, a driven shaft, a drive gear carried by the drive shaft, a plurality of rotatable gears carried by the driven shaft, slidable locking means between said gears carried by the driven shaft and the drive gear and normally in inoperative positions, of a governor member rotatably mounted on the driven shaft, said governor member having a coiled spring connection with the driven shaft, and means carried by the governor member and cooperating with the locking means of the gears in successive order during the rotation of the driven shaft.

2. The combination with a change speed transmission mechanism comprising a drive shaft, a driven shaft, a head carried by the driven shaft, a plurality of gears rotatably mounted on the head, push rod connections between the head and the gears, a countershaft, gear connections between the countershaft and the gears of the head, of a governor disc rotatably mounted on the driven shaft, spring connections between the governor disc and the driven shaft, whereby the driven shaft as it increases speed will cause an increased lagging movement of the disc, and lugs carried by said governor disc and cooperating with the push rods whereby said gears carried by the head will be successively locked to and released from the head from low gear to high gear, as the speed of the driven shaft increases and unlocked from high gear to low gear as the speed of the driven shaft decreases.

3. An automatic change speed transmission mechanism comprising a driven shaft, a drive shaft, a head carried by the driven shaft, a plurality of gears rotatably mounted on said head, locking push rods slidably mounted in the head and adapted to lock said gears to the head, a drive gear carried by the drive shaft, a countershaft, gears carried by the countershaft and meshing with the gears carried by the head and the drive gear, a gear carried by the head and having ratchet connection therewith, a gear carried by and rotatably mounted on the countershaft and meshing with the ratchet gear, a clutch carried by the countershaft and forming means whereby the rotatable gear may be locked to the countershaft for rotation therewith, a governor disc carried by the driven shaft, a yieldable spring connection between the governor disc and the driven shaft, and lugs carried by the governor disc in stepped relation and forming means whereby as the driven shaft increases its speed the push rod will be successively operated and the gears locked to the head successively from low speed to high speed to a direct drive with the drive gear and upon slowing up of the driven shaft the gears will be unlocked in relation to the driven shaft from high speed to low speed.

4. The combination with an automatic change speed transmission mechanism having a drive shaft, a driven shaft, a plurality of gears normally inoperative in relation to the driven shaft, push rods for locking said gears successively to the drive shaft, of a governor member rotatably mounted on the driven shaft, spring connections between the governor member and the driven shaft whereby lag movement of the governor will increase as the speed of the driven shaft increases, and a plurality of members carried by the governor member and cooperating with the push rods and forming means whereby the gears will be successively locked for rotation with the driven shaft.

5. An automatic change speed transmission mechanism comprising a drive shaft, a countershaft, gear connections between the drive shaft and the countershaft, a driven shaft, a head carried by the driven shaft, a low speed gear carried by the head, a gear carried by the countershaft and meshing with the low speed gear and rotatably mounted on the countershaft, means for locking said rotatable gear on the countershaft, ratchet connections between the low speed gear and the head whereby said head may rotate faster than the low speed gear, intermediate gears rotatably mounted on the head, gear connections between the countershaft and the intermediate gears, push rods carried by the heads and adapted to be forced into recesses in the intermediate gears and the gear carried by the drive shaft, a governor disc carried by the driven shaft, yieldable spring connections between the governor and the driven shaft, and a plurality of stepped lugs carried by the governor and in the path of the ends of the push rods.

6. An automatic change speed transmission comprising a drive shaft, a driven shaft, a head carried by the driven shaft, a countershaft, gear connections between the drive shaft and the countershaft, intermediate gears carried by the head and rotatable thereon, gears carried by the countershaft and meshing with the intermediate gears, a low speed gear carried by the head, ratchet connections between the low speed gear and the head, a gear rotatably mounted on the countershaft and meshing with the low speed gear, clutch means whereby said last named countershaft gear may be locked for rotation with the countershaft, a plurality of push rods slidably mounted in the head, said push rods having their inner ends provided with spring actuated members adapted to be forced into elongated recesses of adjacent gears, said push rods having their other ends extending beyond the head, a governor disc mounted on the driven shaft, a coiled spring surrounding the driven shaft, one end of said coiled spring being anchored to the driven shaft, the other end of said coiled spring being anchored to the governor member, and a plurality of lugs carried by the governor member in the path of said last named ends of the push rods and in staggered relation to each other.

7. The combination with an automatic change speed transmission comprising a drive shaft, a driven shaft, a head carried by the driven shaft, a plurality of gear rings rotatably mounted on the head, a countershaft, gear connections between the gear rings and the countershaft and the driven shaft, a reverse gear carried by the driven shaft, one of said gear rings carried by the head having a ratchet connection with the head, a slidable clutch member carried by the countershaft and cooperating with the gear meshing with the gear ring having a ratchet connection with the head, an idle gear meshing with the reversing gear, a reverse gear carried by the clutch member and adapted to be forced into mesh with the idle gear, a plurality of locking push rods carried by the head, of a disc having a yieldable rotatable connection with the driven shaft, and a plurality of lugs carried by said disc and cooperating with the push rods.

8. The combination with a driven member of an automatic change speed transmission comprising a driven member having a plurality of rotatable gear rings thereon, a governor disc having a plurality of lugs thereon, of push rods slidably mounted in the driven member, said push rods being provided with heads in the path of the lugs of the governor and slidably mounted in recesses of the head, spring means cooperating with said heads and normally forcing the same towards the governor, sleeves slidably mounted on the other ends of the push rods, slot and pin connections between the sleeves and the push rods, springs interposed between the sleeves and push rods whereby they are normally held outwardly in engagement with the sides of the gear rings, said slots and pin connections forming means whereby when the push rods are forced inwardly the springs of the sleeves will be compressed and the sleeves forced into recesses of the gear rings and also forming means whereby when the push rods are forced in the other direction by the coiled springs cooperating with their heads, said sleeves will be moved out of the recesses of the rings.

In testimony whereof I affix my signature.

GERARD C. SMITH.